(12) United States Patent
Yoshida

(10) Patent No.: US 6,477,232 B2
(45) Date of Patent: Nov. 5, 2002

(54) ROTARY-ANODE-TYPE X-RAY TUBE

(75) Inventor: Yukinari Yoshida, Nasu-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/005,815

(22) Filed: Dec. 7, 2001

(65) Prior Publication Data

US 2002/0075998 A1 Jun. 20, 2002

(30) Foreign Application Priority Data

Dec. 18, 2000 (JP) ........................................ 2000-383881

(51) Int. Cl.⁷ ................................................ H01J 35/10
(52) U.S. Cl. ...................................................... 378/132
(58) Field of Search ................................. 378/132, 133

(56) References Cited

U.S. PATENT DOCUMENTS 5,583,906 A * 12/1996 Sugiura et al. ............. 378/132

* cited by examiner

Primary Examiner—Craig E. Church
(74) Attorney, Agent, or Firm—Pillsbury Winthrop LLP

(57) ABSTRACT

A rotary-anode-type X-ray tube comprising an anode target, a rotary cylinder supporting the target, and a stationary shaft having radial dynamic-pressure slide bearings to which a liquid-metal lubricant is supplied between the rotary cylinder and the stationary shaft and formed partially having a small-diameter portion with an outside diameter smaller than those of the slide bearings. The X-ray tube is provided with a plurality of reservoirs from which ducts extend. All the ducts open in the small-diameter portion.

7 Claims, 3 Drawing Sheets

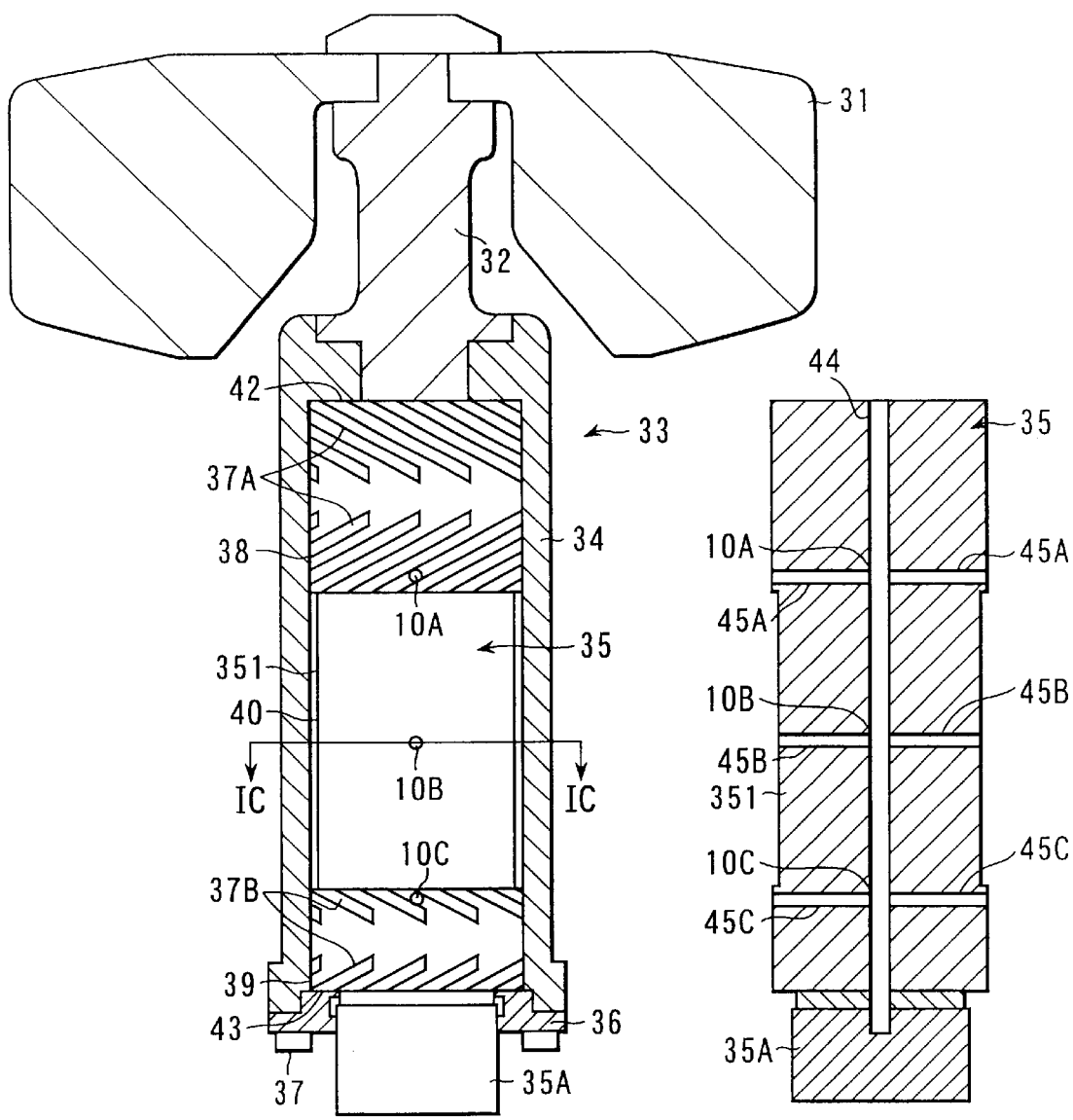
FIG. 1A
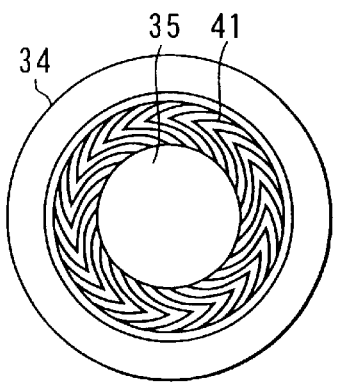
FIG. 1B
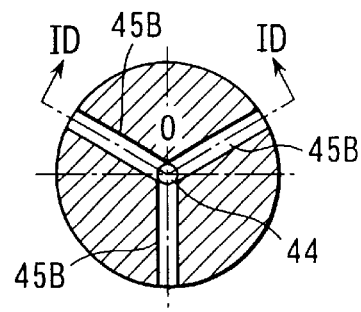
FIG. 1C
FIG. 1D

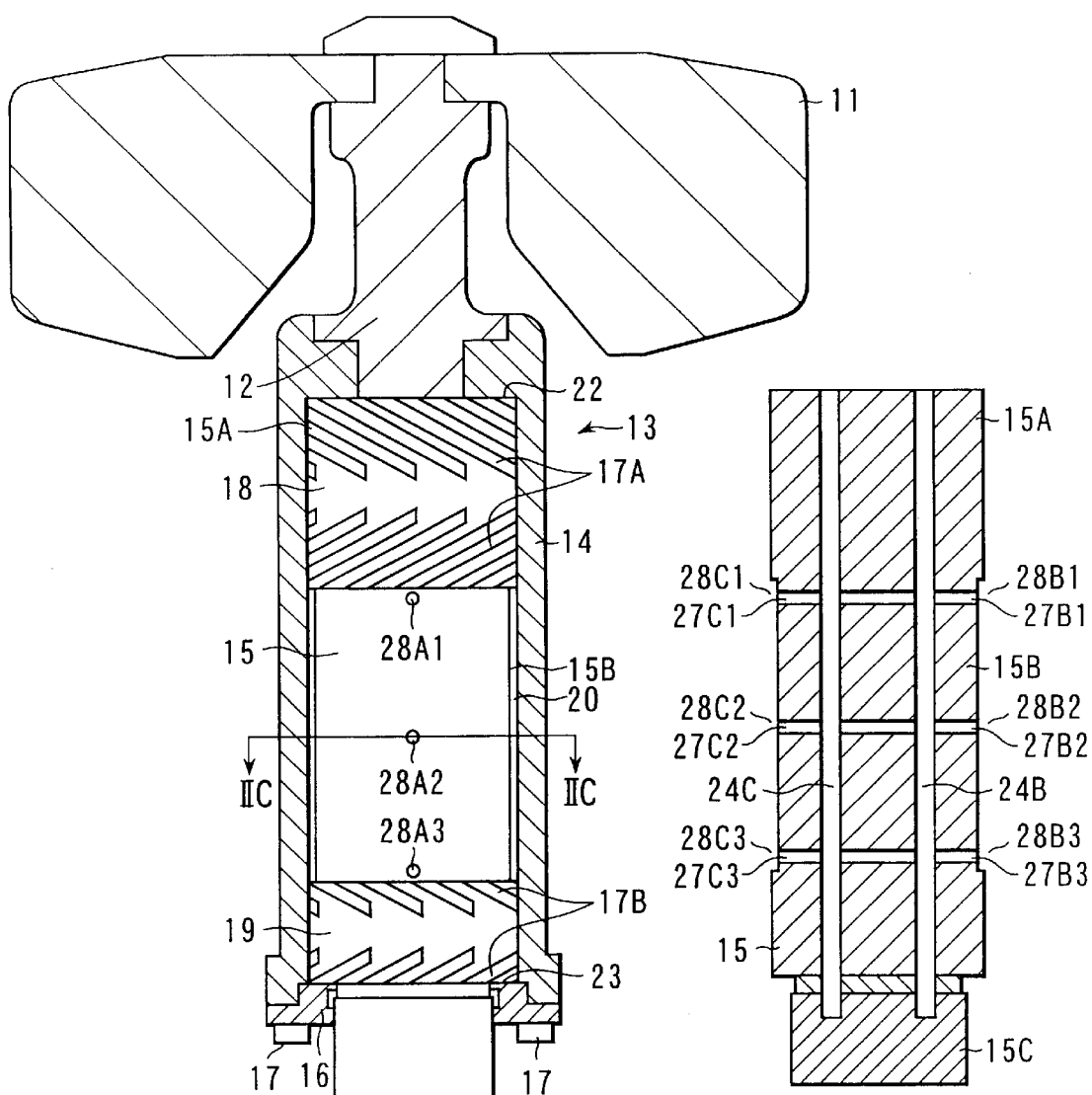
FIG. 2A
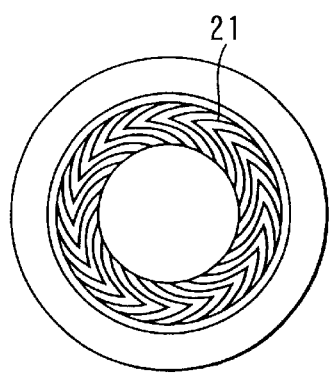
FIG. 2B
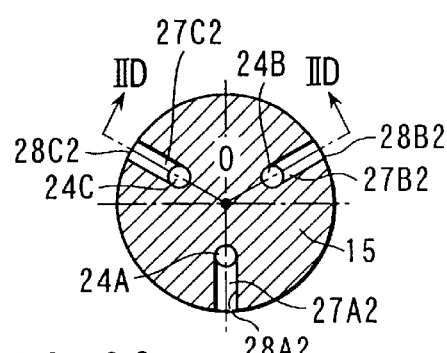
FIG. 2C
FIG. 2D

ROTARY-ANODE-TYPE X-RAY TUBE

CROSS-REFERENCE TO RELATED APPLICATIONS

This application is based upon and claims the benefit of priority from the prior Japanese Patent Application No. 2000-383881, filed Dec. 18, 2000, the entire contents of which are incorporated herein by reference.

BACKGROUND OF THE INVENTION

1. Field of the Invention

The present invention relates to a rotary-anode-type X-ray tube, and more specifically, to a rotary-anode-type X-ray tube in which an anode target is rotatably supported by means of a rotary mechanism having dynamic-pressure slide bearings.

2. Description of the Related Art

A rotary-anode-type X-ray tube is designed so that electron beams are applied to an anode target that rotates at high speed and X-rays are emitted from the anode target. Usually, in the X-ray tube constructed in this manner, the anode target is rotatably supported by means of a rotary mechanism in which bearings are arranged between a rotary cylinder and a stationary shaft.

A conventional rotary-anode-type X-ray tube will now be described with reference to FIGS. 1A to 1D. In FIGS. 1A to 1D, numeral 31 denotes an anode target that emits X-rays. The target 31 is coupled to a rotary mechanism 33 by means of a rotating shaft 32.

The rotary mechanism 33 comprises a rotary structure and a stationary structure. The rotary structure is composed of a rotary cylinder 34 in the form of a bottomed cylinder, as shown in FIG. 1A. As shown in FIGS. 1A and 1B, the stationary structure is composed of a substantially columnar stationary shaft 35 that is fitted in the rotary cylinder 34. The bottom opening of the rotary cylinder 34 is sealed liquid-tight by means of a closer 36.

Pair of herringbone-pattern helical grooves 37A and 37B are formed individually in two positions, top and bottom, on the outer peripheral surface of the stationary shaft 35. A liquid-metal lubricant is fed into the helical grooves 37A and 37B and bearing gaps in which the stationary shaft 35 and the rotary cylinder 34 face each other. The helical grooves and the bearing gaps constitute radial dynamic-pressure slide bearings 38 and 39, individually.

A small-diameter region 351 that has an outside diameter smaller than those of the regions for the dynamic-pressure slide bearings 38 and 39 is formed in a part of the stationary shaft 35, e.g., in that portion which is located between the upper and lower helical grooves 37A and 37B. An annular space 40 is defined between the small-diameter region 351 of the stationary shaft 35 and the rotary cylinder 34. The space 40 serves as a storage chamber that stores the liquid-metal lubricant.

As shown in FIG. 1B, herringbone-pattern helical grooves 41 are formed in a circle on the upper end face of the stationary shaft 35 and the upper surface of the closer 36, individually. The liquid-metal lubricant is fed into the helical grooves 41, a bearing gap in which the upper end face of the stationary shaft 35 and the base of the rotary cylinder 34 face each other, a bearing gap in which the upper surface of the closer 36 and a lower step portion of the stationary shaft 35 face each other, etc. The helical grooves and the bearing gaps constitute thrust dynamic-pressure slide bearings 42 and 43.

As shown in the sectional view of FIG. 1C taken along line IC—IC of FIG. 1A, the central portion of the stationary shaft 35 is provided with a reservoir 44 that extends along a tube axis and serve to store the liquid-metal lubricant. FIG. 1D is a sectional view of the stationary shaft 35 shown in FIG. 1A, taken along line ID-O-ID of FIG. 1C. In three positions 10A, 10B and 10C that are spaced along the axis of the reservoir 44, as shown in FIGS. 1C and 1D, three sets of ducts 45A, 45B and 45C that radially diverge extend at equal angular spaces of 120 degrees in the circumferential direction. The ducts 45A that are situated in the upper part of FIG. 1A and the ducts 45C that are situated in the lower part of FIG. 1A open into the helical grooves 37A and 37B that constitute the dynamic-pressure slide bearings 38 and 39, respectively, while the ducts 45B that are situated in the middle part of FIG. 1A opens into the small-diameter region 351 of the stationary shaft 35.

When the X-ray tube is actuated to cause the rotary structure of the rotary mechanism to rotate, the liquid-metal lubricant in the reservoir 44 circulates through the ducts 45A, 45B and 45C, helical grooves of the dynamic-pressure slide bearings 38, 39, 42 and 43, bearing gaps, etc. Thus, the bearing portions can be prevented from being exhausted of the lubricant. The reservoir 44 serves not only as a passage through which the lubricant circulates but also as a passage through which gases produced in the bearings are circulated.

If any gas pools are formed in the reservoir through which the liquid-metal lubricant circulates, during the operation of the conventional rotary-anode-type X-ray tube, the lubricant may fail to circulate satisfactorily, so that the bearing portions may be exhausted of the lubricant, in some cases. In consequence, the rotation of the rotary structure that constitutes the rotary mechanism becomes unstable. In the worst case, the so-called cling occurs such that a part of the rotary cylinder directly touches a part of the stationary shaft, whereby the rotation of the rotary cylinder is stopped.

If a plurality of ducts are provided diverging from the reservoir, the respective distal ends of some ducts, such as those ones which are situated at the top and bottom, open in the helical groove portions on the outer periphery of the stationary shaft. Accordingly, the respective positions of the end openings of the ducts must be aligned individually with those of the helical grooves. Thus, the manufacture is difficult, requiring high mechanical accuracy.

BRIEF SUMMARY OF THE INVENTION

The object of the present invention is to provide a rotary-anode-type X-ray tube, which can be manufactured with ease and in which a rotary structure that constitutes a rotary mechanism can rotate satisfactorily.

According to the present invention, there is provided a rotary-anode-type X-ray tube, which comprises: an anode target;

a rotary cylinder coupled mechanically to the anode target and having an inner surface inside;

a columnar stationary shaft having a central axis, opposite end faces, a pair of large-diameter portions, and a small-diameter portion between the large-diameter portions, the stationary shaft being fitted in the rotary cylinder, the large- and small-diameter portions having an outer surface each, the outer surface of the small-diameter portion and the inner surface of the rotary cylinder defining an annular first reservoir, the stationary shaft having second reservoirs extending along the central axis therein and a plurality of groups of ducts, wherein each of the second reservoir is connected to the first reservoir by the ducts of the group;

radial dynamic-pressure slide bearings located between the respective outer surfaces of the large-diameter portions and the inner surface of the rotary cylinder, individually;

a thrust dynamic-pressure slide bearing provided between an end face of the stationary shaft and the inner surface of the rotary cylinder; and a liquid-metal lubricant filling the first and second reservoirs, ducts, and radial and thrust dynamic-pressure slide bearings.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a sectional view schematically showing a conventional rotary-anode-type X-ray tube;

FIG. 1B is a plan view schematically showing the construction of a thrust bearing of the rotary-anode-type X-ray tube shown in FIG. 1A;

FIG. 1C is a sectional view schematically showing a cross section of the rotary-anode-type X-ray tube taken along line IC—IC of FIG. 1A;

FIG. 1D is a sectional view schematically showing a stationary shaft of the rotary-anode-type X-ray tube taken along line ID-O-ID of FIG. 1C;

FIG. 2A is a sectional view schematically showing a rotary-anode-type X-ray tube according to an embodiment of the invention;

FIG. 2B is a plan view schematically showing the construction of a thrust bearing of the rotary-anode-type X-ray tube shown in FIG. 2A;

FIG. 2C is a sectional view schematically showing a cross section of the rotary-anode-type X-ray tube taken along line IIC—IIC of FIG. 2A;

FIG. 2D is a sectional view schematically showing a stationary shaft of the rotary-anode-type X-ray tube taken along line IID-O-IID of FIG. 2C;

FIG. 3A is a sectional view schematically showing a rotary-anode-type X-ray tube according to another embodiment of the invention;

FIG. 3D is a sectional view schematically showing a stationary shaft of the rotary-anode-type X-ray tube taken along line IIID-O-IIID of FIG. 3C.

DETAILED DESCRIPTION OF THE INVENTION

Figure 3B:
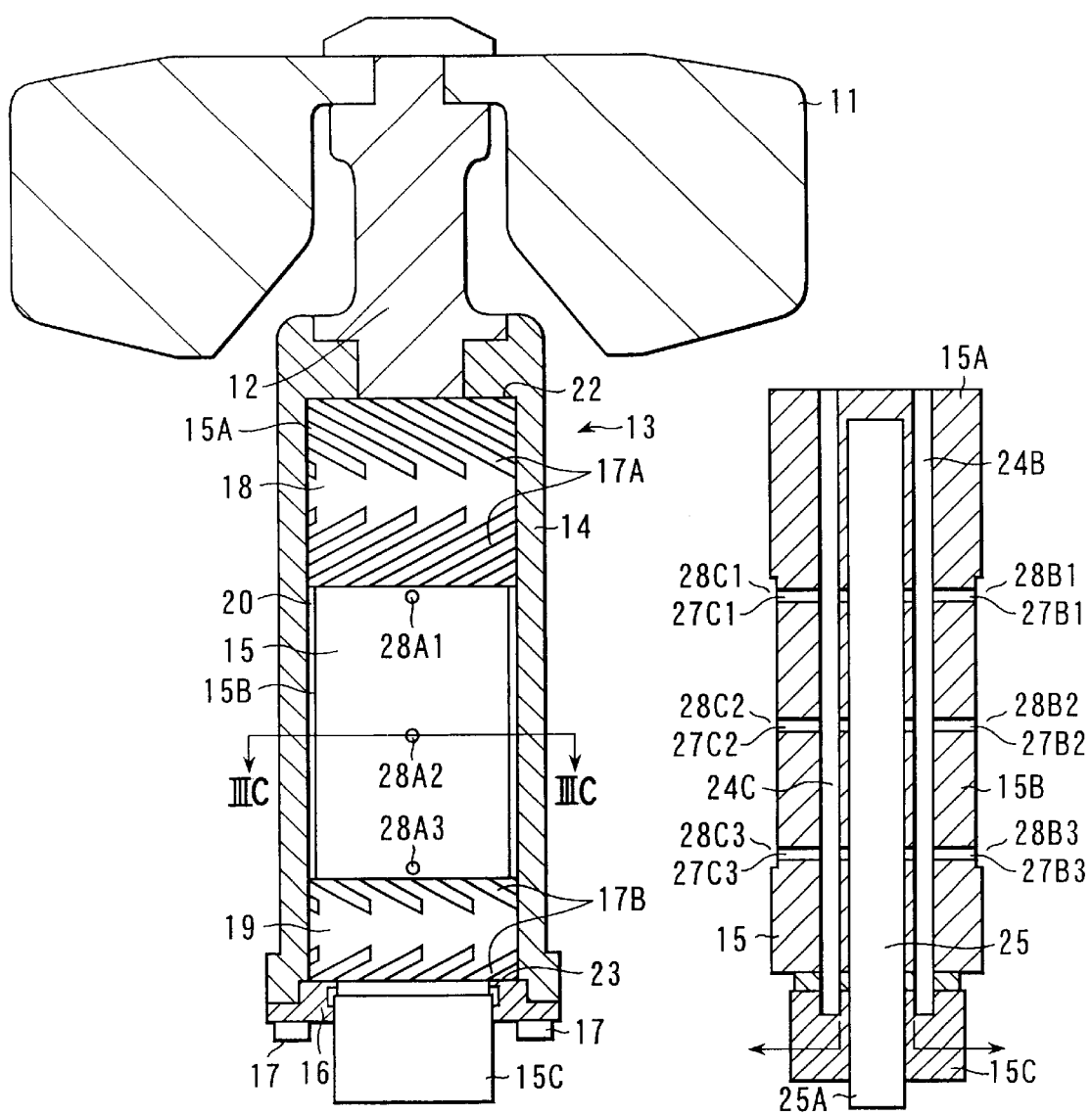
FIG. 3B is a plan view schematically showing the construction of a thrust bearing of the rotary-anode-type X-ray tube shown in FIG. 3A.
Figure 3B:
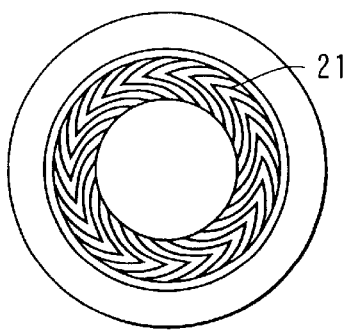

A rotary-anode-type X-ray tube according to an embodiment of the present invention will now be described with reference to FIGS. 2A to 2D. In FIGS. 2A to 2D, numeral 11 denotes an anode target that emits X-rays as it is irradiated with electron beams from a cathode (not shown). The target 11 is coupled to a rotary mechanism 13 by means of a rotating shaft 12.

As shown in FIG. 2A, the rotary mechanism 13 comprises a rotary structure and a stationary structure. The rotary structure is composed of a rotary cylinder 14 in the form of a bottomed cylinder, as shown in FIG. 2A. As shown in FIGS. 2A and 2B, the stationary structure is composed of a substantially columnar stationary shaft 15 that is fitted in the rotary cylinder 14 with a fine gap between the two.

As shown in FIG. 2A, the bottom opening of the rotary cylinder 14 is sealed by means of a closer 16. The closer 16 is fixed to the rotary cylinder 14 by means of screws 17, and along with the cylinder 14, constitutes the rotary structure of the rotary mechanism 13. The stationary shaft 15 extends through the closer 16, and its lower end portion 15C forms an anode supporting portion for supporting the anode target 11.

The rotary mechanism 13 is formed having dynamic-pressure slide bearings between the rotary structure and the stationary structure. As shown in FIG. 2A, the stationary shaft 15 has a pair of large-diameter portions 15A on its upper and lower parts, individually, and a small-diameter portion 15B that connects the large-diameter portions 15A. Two pairs of herringbone-pattern helical grooves 17A and 17B are formed on the outer peripheral surface of the large-diameter portion 15A. An annular space 20 to be filled with a liquid metal is provided between the small-diameter portion 15B and the inner peripheral surface of the rotary cylinder 14. A liquid-metal lubricant is fed into the helical grooves 17A and 17B and bearing gaps in which the grooves 17A and 17B face the inner peripheral surface of the rotary cylinder 14. The helical grooves and the bearing gaps constitute radial dynamic-pressure slide bearings 18 and 19. The liquid-metal lubricant is also stored in the annular space 20 between the small-diameter portion 15B of the stationary shaft 15 and the rotary cylinder 14.

As shown in FIG. 2B, herringbone-pattern helical grooves 21 are formed in a circle on the upper end face of the stationary shaft 15 and the upper surface of the closer 16, individually. The liquid-metal lubricant is fed into the helical grooves 21, a bearing gap in which the upper end face of the stationary shaft 15 and the base of the rotary cylinder 14 face each other, and a bearing gap in which the upper surface of the closer 16 and the lower end face of the stationary shaft 15 face each other. The helical grooves and the bearing gaps constitute thrust dynamic-pressure slide bearings 22 and 23.

A Ga—In—Sn alloy is an example of the liquid-metal lubricant.

As shown in the sectional view of FIG. 2C taken along line IIC—IIC of FIG. 2A, the stationary shaft 15 has three reservoirs 24A to 24C that extend in its axial direction and serve to store the liquid-metal lubricant. The reservoirs 24A to 24C are arranged on the circumference of a circle around a tube axis O. As shown in FIG. 2D, the reservoirs extend from the lower end portion 15C and open in the upper end face of the stationary shaft 15. Thus, the three reservoirs 24A to 24C communicate with the thrust dynamic-pressure slide bearing 22. The reservoirs 24A to 24C are filled with the liquid-metal lubricant.

As shown in FIGS. 2C and 2D, moreover, the reservoirs 24A to 24C are provided with first to third groups of ducts 27A1 to 27A3, 27B1 to 27B3, and 27C1 to 27C3, respectively, which are arranged at given spaces in the tube-axis direction. The ducts 27A1 to 27A3, 27B1 to 27B3, and 27C1 to 27C3 extend in the radial direction at angular spaces of 120 degrees from one another around the tube axis.

In FIG. 2D, furthermore, the first to third groups of ducts 27A1 to 27A3, 27B1 to 27B3, and 27C1 to 27C3 have openings 28A1 to 28A3, 28B1 to 28B3, and 28C1 to 28C3, respectively. All these openings 28A1 to 28A3, 28B1 to 28B3, and 28C1 to 28C3 open in the small-diameter portion 15B of the stationary shaft 15 so that the ducts 27A1 to 27A3, 27B1 to 27B3, and 27C1 to 27C3 communicate with the annular space 20. The ducts 27A1 to 27A3, 27B1 to 27B3, and 27C1 to 27C3 and the annular space 20 are also filled with the liquid-metal lubricant. Preferably, the second openings 28B1 to 28B3 are located between the first and third openings 28A1 to 28A3 and 28C1 to 28C3, and the first and third openings 28A1 to 28A3 and 28C1 to 28C3 are located close to the radial dynamic-pressure slide bearings 18 and 19, and open in the small-diameter portion 15B outside bearings 18 and 19. Since the first and third openings 28A1 to 28A3 and 28C1 to 28C3 are located close to the bearings 18 and 19, the liquid-metal lubricant can be effectively fed from the reservoirs 24A to 24C or the ducts 27A1 to 27A3 and 27C1 to 27C3 to the dynamic-pressure slide bearings 18 and 19 when the rotary cylinder 14 is rotated. Thus, the lubricant in the bearings 18 and 19 can be prevented from being in short supply.

If an external rotating magnetic field is applied to the rotary cylinder 14 of the rotary mechanism 13, in the rotary-anode-type X-ray tube described above, the rotary cylinder 14 is rotated, so that the anode target 11 that is coupled to the cylinder 14 is rotated. As the anode target 11 is rotated, electron beams are applied to the target 11, whereupon X-rays are emitted from the target 11.

When the X-ray tube is actuated to cause the rotary structure of the rotary mechanism 13, e.g., the rotary cylinder 14, to rotate, the liquid-metal lubricant in the reservoirs 24A to 24C circulates through the ducts 27A1 to 27A3, 27B1 to 27B3, and 27C1 to 27C3, helical grooves, bearing gaps, etc. Thus, the bearing portions can be prevented from being exhausted of the lubricant. The reservoirs 24A to 24C serve not only as passages through which the lubricant circulates but also as passages through which gases produced in the bearings are circulated.

In the arrangement described above, the stationary shaft is provided with a plurality of reservoirs, e.g., the three reservoirs 24A to 24C. If one of the reservoirs is clogged with gas pools or the like, thereby preventing the liquid-metal lubricant from being circulated or supplied, therefore, the lubricant can be circulated and supplied to the bearing portions through the two remaining reservoir. Thus, the lubricant can be prevented from being in short supply, so that the rotary structure can rotate steadily with high reliability.

The respective distal ends of the ducts 27A1 to 27A3, 27B1 to 27B3, and 27C1 to 27C3 that diverge from their corresponding reservoirs 24A to 24C open in the small-diameter portion 15B of the stationary shaft 15 that corresponds to the region where the helical grooves are not formed. Thus, the respective openings of the ducts 27A1 to 27A3, 27B1 to 27B3, and 27C1 to 27C3 and the helical grooves need not be aligned with one another, so that the manufacture is easy.

Another embodiment of the present invention will now be described with reference to FIGS. 3A to 3D. In FIGS. 3A to 3D and FIGS. 2A to 2D, like numerals refer to corresponding portions, and a repeated description of those portions is partially omitted.

Figure 3C:
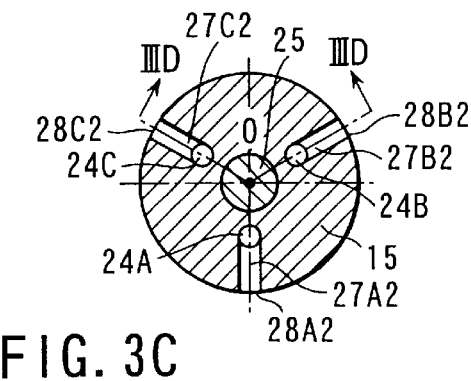
FIG. 3C is a sectional view schematically showing a cross section of the rotary-anode-type X-ray tube taken along line IIIC—IIIC of FIG. 3A.

In a rotary-anode-type X-ray tube shown in FIGS. 3A to 3D, a stationary shaft 15 is provided with a cooling structure unit 25, as shown in FIGS. 3C and 3D. The cooling structure unit 25 extends along the tube axis so as to be surrounded by three reservoirs 24A to 24C. More specifically, as shown in FIG. 3D, a hole is formed extending along the tube axis of the stationary shaft 15, and a heat transfer member with heat conductivity higher than that of the stationary shaft 15 is embedded in the hole and bonded to the inner surface of the hole with wax or the like.

A lower end 25A of the cooling structure unit 25 projects from an end face of the stationary shaft 15, and partially extends to the outside of a vacuum container (not shown) that constitutes the X-ray tube.

The heat transfer member that constitutes the cooling structure unit 25 is formed of copper or a composite material that is prepared by infiltrating 35% by weight of copper into a sintered tungsten material.

According to this arrangement, the heat dissipation properties of the X-ray tube can be improved by cooling the distal end portion 25A of the cooling structure unit 25 that extends to the outside of the vacuum container, for example. In consequence, there may be provided a long-life rotary-anode-type X-ray tube with high performance in which an anode target 11 can be rotated at high speed.

In the arrangement described above, the cooling structure unit 25 is formed of the heat transfer member. Alternatively, however, the heat transfer member may be replaced with a coolant passage through which insulating oil as a coolant flows. More specifically, the cooling structure unit 25 is a double cylinder that is formed of two sub-cylinders for guiding the coolant. In this case, the coolant introduced through the one sub-cylinder is discharged through the other sub-cylinder. In this arrangement, heat transferred to the stationary shaft 15 is transmitted to the coolant and radiated to the outside. Thus, the temperature of the stationary shaft 15 can be prevented from exceeding a given level.

Although the reservoirs according to the embodiments described herein are three in number, they may be two to six in number, preferably three or four.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rotary-anode-type X-ray tube comprising:

an anode target;

a rotary cylinder coupled mechanically to the anode target and having an inner surface inside;

a columnar stationary shaft having a central axis, opposite end faces, a pair of large-diameter portions, and a small-diameter portion between the large-diameter portions, the stationary shaft being fitted in the rotary cylinder, the large- and small-diameter portions having an outer surface each, the outer surface of the small-diameter portion and the inner surface of the rotary cylinder defining an annular first reservoir, the stationary shaft having second reservoirs extending along the central axis therein and a plurality of groups of ducts, wherein each of the second reservoir is connected to the first reservoir by the ducts of the group;

radial dynamic-pressure slide bearings located between the respective outer surfaces of the large-diameter portions and the inner surface of the rotary cylinder, individually;

a thrust dynamic-pressure slide bearing provided between an end face of the stationary shaft and the inner surface of the rotary cylinder; and a liquid-metal lubricant filling the first and second reservoirs, ducts, and radial and thrust dynamic-pressure slide bearings.

2. A rotary-anode-type X-ray tube according to claim 1, wherein said second reservoirs are located on the same radius around the central axis of the stationary shaft.

3. A rotary-anode-type X-ray tube according to claim 1, wherein said plurality of groups of ducts are arranged at given spaces along the central axis.

4. A rotary-anode-type X-ray tube according to claim 1, wherein said stationary shaft includes a heat transfer member embedded therein along the central axis thereof and having heat conductivity higher than that of the stationary shaft.

5. A rotary-anode-type X-ray tube according to claim 1, wherein said stationary shaft has a coolant passage extending along the central axis thereof.

6. A rotary-anode-type X-ray tube according to claim 4, wherein said second reservoirs are located around the heat transfer member.

7. A rotary-anode-type X-ray tube according to claim 4, wherein said second reservoirs are located around the coolant passage.

* * * * *